United States Patent
Klink et al.

(10) Patent No.: US 11,453,397 B2
(45) Date of Patent: Sep. 27, 2022

(54) ASSISTANCE SYSTEM FOR A VEHICLE

(71) Applicant: Volkswagen Aktiengesellschaft, Wolfsburg (DE)

(72) Inventors: Benjamin Klink, Munich (DE); Dominik Kirschner, Ingolstadt (DE); Thomas Eigel, Berlin (DE); Johanna Wegner, Gifhorn (DE); Sebastian Busch, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 48 days.

(21) Appl. No.: 16/955,010

(22) PCT Filed: Jan. 11, 2019

(86) PCT No.: PCT/EP2019/050628
§ 371 (c)(1),
(2) Date: Jun. 17, 2020

(87) PCT Pub. No.: WO2019/141596
PCT Pub. Date: Jul. 25, 2019

(65) Prior Publication Data
US 2020/0377098 A1 Dec. 3, 2020

(30) Foreign Application Priority Data

Jan. 18, 2018 (DE) .......................... 102018200821.3
Oct. 7, 2018 (DE) .......................... 102018211339.4

(51) Int. Cl.
*B60W 30/18* (2012.01)
*B60Q 5/00* (2006.01)
(Continued)

(52) U.S. Cl.
CPC ....... *B60W 30/18109* (2013.01); *B60Q 5/005* (2013.01); *B60Q 9/00* (2013.01);
(Continued)

(58) Field of Classification Search
CPC .......... B60K 28/06; B60Q 5/005; B60Q 9/00; B60Q 5/008; B60Q 9/002; B60Q 9/003;
(Continued)

(56) References Cited

U.S. PATENT DOCUMENTS 10,821,952 B2 * 11/2020 Baehrle-Miller ..... B60T 13/741
2006/0225971 A1 * 10/2006 Jaeger ..................... B60T 7/042
188/106 P (Continued)

FOREIGN PATENT DOCUMENTS

| DE | 10146770 A1 | 4/2003 |
| DE | 10258617 A1 | 4/2004 |

(Continued)

OTHER PUBLICATIONS

PCT/EP2019/050628. International Search Report (dated Mar. 19, 2019).

*Primary Examiner* — Babar Sarwar
(74) *Attorney, Agent, or Firm* — Loza & Loza, LLP; Peter Zura

(57) ABSTRACT

An assistance System for a vehicle for providing an emergency stop assistance function that includes an execution device to execute the emergency stop assistance function using at least one of a plurality of activation stages; a detection device for automatic detection of driver inactivity, in order to activate the emergency stop assistance function using a first stage selection of the activation stages; a triggering device for monitoring an operating element of an electrical parking brake or a parking lock of a transmission of the vehicle, in order to activate the emergency assistance (Continued)

function using a second stage selection of the activation stages, which differs from the first stage selection, in the case of a manual activation of the operating element.

18 Claims, 1 Drawing Sheet

(51) Int. Cl.
| | | |
|---|---|---|
| *B60Q 9/00* | (2006.01) | |
| *B60T 7/08* | (2006.01) | |
| *B60T 7/14* | (2006.01) | |
| *B60T 17/20* | (2006.01) | |
| *B60W 10/18* | (2012.01) | |
| *B60W 10/30* | (2006.01) | |
| *B60T 7/22* | (2006.01) | |
| *B60W 30/09* | (2012.01) | |

(52) U.S. Cl.
CPC .............. *B60T 7/08* (2013.01); *B60T 7/14* (2013.01); *B60T 17/20* (2013.01); *B60W 10/182* (2013.01); *B60W 10/30* (2013.01); *B60T 7/22* (2013.01); *B60W 30/09* (2013.01); *B60W 2540/12* (2013.01); *B60W 2540/229* (2020.02); *B60W 2710/18* (2013.01); *B60W 2710/30* (2013.01)

(58) Field of Classification Search
CPC ...... B60T 17/20; B60T 2201/022; B60T 7/08; B60T 7/085; B60T 7/14; B60T 7/22; B60T 7/16; B60T 7/18; B60T 17/22; B60T 17/221; B60W 10/182; B60W 10/30; B60W 2540/12; B60W 2540/229; B60W 2710/18; B60W 2710/30; B60W 30/09; B60W 30/095; B60W 30/18109; B60W 30/18118; B60W 30/18127; B60W 10/184; B60W 2540/14; B60W 2540/26; B60W 2710/182; B60W 2710/184; B60W 2710/186; B60W 2710/188; G05G 1/34; G08B 21/06
See application file for complete search history.

(56) References Cited

U.S. PATENT DOCUMENTS

| | | | | |
|---|---|---|---|---|
| 2006/0225972 | A1* | 10/2006 | Klusemann | ............... B60T 7/10 188/158 |
| 2010/0131168 | A1* | 5/2010 | Maruyama | ............... B60T 7/22 701/96 |
| 2012/0006634 | A1* | 1/2012 | Bensch | ................... B60T 7/085 188/106 P |
| 2012/0123644 | A1* | 5/2012 | Waldmann | ............. B60T 7/042 701/45 |
| 2013/0018545 | A1* | 1/2013 | Prakah-Asante | ..... B60W 40/04 701/36 |
| 2017/0008528 | A1* | 1/2017 | Nakatsuka | ........... B60W 50/10 |
| 2017/0320499 | A1* | 11/2017 | Bednarek | ............... B60T 1/005 |
| 2018/0045832 | A1* | 2/2018 | Ibrahim | ................. G08G 1/167 |
| 2018/0362013 | A1* | 12/2018 | Ungermann | ........ B60W 10/182 |

FOREIGN PATENT DOCUMENTS

| | | | | |
|---|---|---|---|---|
| DE | 102005016001 | A1 | 10/2006 | |
| DE | 102010049351 | A1 | 4/2012 | |
| DE | 102010044024 | A1 | 5/2012 | |
| DE | 102011109618 | A1 | 2/2013 | |
| DE | 102011109618 | A1 * | 2/2013 | ............ B60W 10/04 |
| DE | 102012024370 | A1 | 7/2013 | |
| DE | 102012216038 | A1 | 3/2014 | |
| DE | 102013015727 | A1 | 4/2014 | |
| DE | 102013007857 | A1 | 11/2014 | |
| DE | 102013009339 | A1 | 12/2014 | |
| DE | 102013009400 | A1 | 12/2014 | |
| DE | 102013009423 | A1 | 12/2014 | |
| DE | 102014224645 | A1 | 6/2015 | |
| DE | 102016203020 | A1 | 8/2017 | |
| DE | 102016203021 | A1 | 8/2017 | |
| DE | 102017113823 | A1 | 12/2017 | |
| DE | 102017117471 | A1 | 2/2018 | |

* cited by examiner

ASSISTANCE SYSTEM FOR A VEHICLE

RELATED APPLICATIONS

The present application claims priority to International Pat. App. No. PCT/EP2019/050628, titled "Assistance System for a Vehicle," to Klink et al, filed Jan. 11, 2019, which claims priority to German Pat. App. No. DE 10 2018 200 821.3, filed Jan. 18, 2018 the contents of each being incorporated by reference in their entirety herein.

BACKGROUND

The present disclosure relates to an assistance system for a vehicle that provides an emergency stop assistance function. The present disclosure also relates to a method for providing the emergency stop assistance function.

It is known in the prior art that an emergency stop assistance function can be automatically activated when driver inactivity is detected. The emergency stop assistance function is used to automatically and/or autonomously safely bring the vehicle to a standstill, without the aid of the driver. It is frequently disadvantageous that another occupant, such as a passenger, cannot optimally interact with the emergency stop assistance function.

Assistance systems of this type are known from DE 10 2016 203 020 A1 and DE 10 2016 203 021 A1.

The present disclosure illustrates technologies and techniques to at least partially rectify the disadvantages described above. In some illustrative examples, improved means of executing an emergency stop assistance function are disclosed.

SUMMARY

In various examples, an assistance system is disclosed for a vehicle, preferably a motor vehicle and/or a passenger vehicle, wherein the assistance system serves to provide an emergency stop assistance function. The assistance system may be configured with a plurality of devices including, but not limited to, an execution device for executing the emergency stop assistance function with at least one of numerous activation stages, and a detection device for automatically detecting driver inactivity, to activate the emergency stop assistance function with a first stage selection of the activation stages, such that the execution device preferably executes the emergency stop assistance function with the first stage selection of the activation stages in accordance with an automatic type of activation. The assistance system may also include a triggering device for monitoring an operating element in an electrical parking brake (i.e. hand brake) or a parking lock in a transmission, in particular an automatic transmission, in the vehicle, to activate the emergency stop assistance function with a second stage selection of the activation stages when the operating element has been manually actuated by a vehicle occupant, which differs from the first stage selection, such that the execution device preferably executes the emergency stop assistance function with the second stage selection of the activation stages in accordance with a manual type of activation.

Through the use of the manual actuation to activate the emergency stop assistance function, an advantage can be obtained that, if there is a passenger, or if the driver is still able to function properly, the emergency stop of the vehicle can be initiated early enough to prevent collisions. With regard to the enormous risk that uncontrolled driving involves, valuable time needed for triggering the emergency stop assistance can be saved in this manner. A single-stage and simple action can be provided for manual actuation, e.g. pulling or pushing an operating element. In particular, the driver and passengers are already aware that the electronic parking brake executes a braking procedure and therefore can be operated intuitively. To further improve this, the operating element can also be labeled. The different stage selections enable an optimal adaptation to the type of activation, i.e. manually, using the operating element, or automatically, through the detection of driver inactivity. The adaptability of the assistance system can be improved, e.g. to execute a quicker emergency stop with a manual activation.

BRIEF DESCRIPTION OF THE DRAWINGS

Further advantages, features and details of the invention can be derived from the following description in which exemplary embodiments of the invention are described in detail with reference to the drawings. Features specified in the claims and the description can each be substantial to the invention in and of themselves, or in arbitrary combinations thereof. Therein:

DETAILED DESCRIPTION

Figure 1:
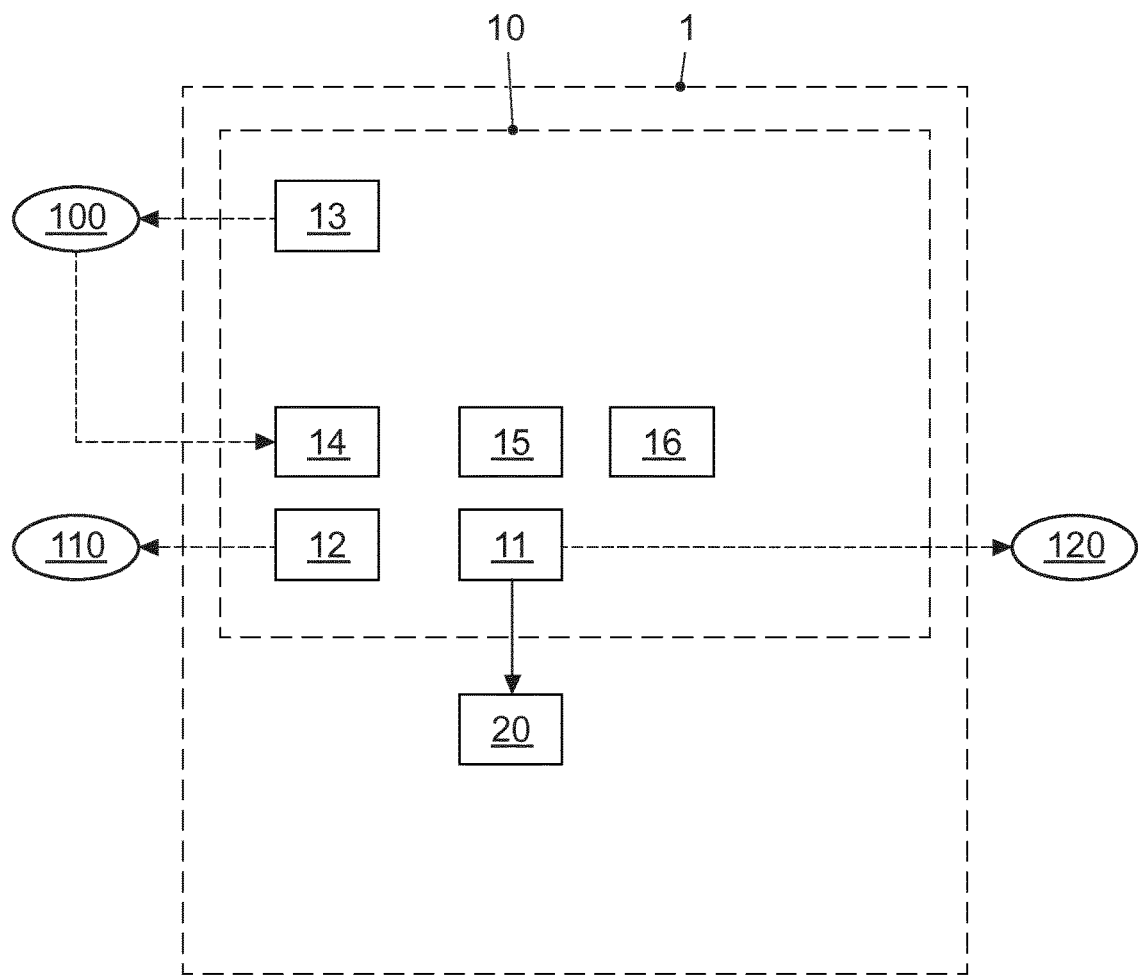
FIG. 1: shows a schematic illustration of an assistance system according to an illustrative example.

As discussed above, the assistance system may be configured with a plurality of devices including, but not limited to, an execution device, a detection device, and a triggering device for monitoring an operating element in an electrical parking brake (i.e. hand brake) or a parking lock in a transmission.

The operating element for activating the electric parking brake (also: electric hand brake) or the parking lock, can primarily be located in the interior of the vehicle, wherein the actuation takes place, e.g. through a movement in a first direction (e.g. pulling) or to a parking position ("P"). This operation is intuitive to the passengers, because they link the actuation of the electric parking brake or parking position to stopping the vehicle. The manual activation of the emergency stop assistance function can take place, e.g., in that the operating element must be actuated for a predefined time period, e.g. pulled in the first direction or pushed in the opposite direction. A corresponding warning can inform the passengers of the upcoming activation during the actuation. The manual activation of the emergency stop assistance function can first take place after the predefined time period has elapsed while the operating element is being actuated. In other words, a temporal intermittent activation of the operating element does not result in activation of the emergency stop assistance function. The manual activation can then result in a further braking of the vehicle parallel to the parking brake braking, until the vehicle comes to a standstill. A so-called escalation curve of the emergency stop assistance function can be altered in the manual activation in relation to the automatic activation, such that the escalation stages are shortened, i.e. the second stage selection takes place instead of the first stage selection, for example.

The operating element for engaging or releasing the parking lock in the transmission may be configured as a gearshift lever or a button, for example. To enable actuation of the operating element while driving, the parking lock is not exclusively mechanically engaged. This means that there is no fixed mechanical connection between the operating element and the parking lock. Instead, "shift by wire" systems can be used, in which the operating element and the parking lock are connected via electronic components. Another possibility is offered by releasable mechanical connections. If the operating element is actuated while driving, the mechanical connection is decoupled. When the vehicle is stopped, however, the mechanical connection is intact, such that the parking lock can be engaged.

The first and/or second stage selections can include a selection of a plurality of activation stages, wherein the at least one selected activation stage (in the case of numerous activation stages, also in the given sequence) is then executed for executing the emergency stop assistance function. A first activation stage may include issuing a warning (e.g., a text message or symbol or pictogram on the instrument panel) to the driver, and a second activation stage may include initiation of at least one alarm action, such as pressing on the brake (pumping the brakes) or tightening a seatbelt (intermittent activation of the seatbelt tensioner), in order to alert the driver. A third activation stage may include the issuing of a warning signal for the stopping, such as an acoustic warning and/or an environmental warning, and/or a switching off function, such as switching off the infotainment system and/or an internal lighting in the vehicle, and/or an unlocking function, such as unlocking the doors of the vehicle, and/or initiating an emergency telephone function, such as transmitting the vehicle position data.

In some examples, the first, then the second, and subsequently the third activation stage can be executed in the first stage selection, and in the second stage selection, first the second, and then the third, or immediately the third, activation stage can be executed. The emergency stop assistance function, and in particular the third activation stage, may execute a braking of the vehicle until reaching a standstill, in particular while simultaneously evaluating the environment and/or traffic. The vehicle may also be autonomously driven to the side of the road, a parking space, or the shoulder, and stopped. The assistance system may also automatically decide whether stopping on the side of the road, in a parking space, or on the actual roadway is safer, in order to remain in the current lane during the stopping maneuver. Optionally, at least in the second stage selection, this decision may be manually influenced, e.g. by a passenger.

An output initiation device may be configured to issue a warning to the occupants of the vehicle in accordance with a first activation stage. The execution device may be configured to execute the first activation stage in accordance with the first stage selection, and to skip the first activation stage and execute the second activation stage directly in accordance with the second stage selection. This can save time, because the first activation stage may not be necessary with a manual activation.

An alarm initiation device may be configured for initiating at least one alarm action in the vehicle, preferably to initiate a pumping of the brakes, and/or a tensioning of the seatbelt in the vehicle in accordance with a second activation stage. The execution device may preferably be configured to activate the second activation stage in accordance with the first stage selection and/or in accordance with the second stage selection. This has the advantage that the driver can be alerted in order to assume control of the vehicle.

In some examples, a function initiation device may be configured in the framework of the present disclosure for initiating safety-relevant functions of the vehicle accompanying a stopping of the vehicle in accordance with a third activation stage, wherein the execution device is preferably configured to execute the third activation stage in accordance with the first stage selection and/or in accordance with the second stage selection. The safety-relevant functions may include, for example, an environment warning (e.g., activation of a warning light system), an emergency call, etc.

At least one, or all, of the devices in the assistance system according to the present disclosure described herein, such as the function initiation device, and/or the triggering device, and/or the detection device, and/or the execution device, and/or the output initiation device, and/or the alarm initiation device, can be separate devices or part of a collective device, and/or computer-implemented devices, e.g. as part of a computer program.

The triggering device can also be configured to ignore temporal intermittent activation of the operating element. When the operating element is moved and/or held in an actuating position, a predefined time period can elapse, and the activation of the emergency stop assistance function can first take place manually after this time period has elapsed, and the operating element is still being moved to and/or held in the actuation position. The actuation position can be a position of the operating element that is reached by pulling and/or pushing the operating element.

The present disclosure also includes a method for providing an emergency stop assistance function in a vehicle. The method may include, but is not limited to monitoring a driver of the vehicle, e.g. by observing an interior of the vehicle with a camera, and/or with a steering wheel sensor system, in order to automatically activate an emergency-stop assistance function if driver inactivity has been detected. The method may also include monitoring an operating element for an electrical parking brake or a parking lock in a vehicle transmission, e.g. through movement and/or position sensors on the operating element, to manually activate the emergency stop assistance function when a manual actuation of the operating element has been detected. The method may further include executing the emergency stop assistance function with a selection of at least one of numerous activation stages, wherein the selection depends on the type of activation, and differs in particular, i.e. with different activation stages.

In some examples, the selection may differ for the manual and automatic types of activation. As a result, the method according to the present disclosure has the same advantages comprehensively described in reference to the assistance system according to the invention. Furthermore, an assistance system according to the invention can also be used to carry out the method according to the invention to provide the emergency stop assistance function.

The emergency stop assistance function may first be activated automatically, for example, using a first stage selection, when driver inactivity has been detected for a defined period of time (e.g. a few seconds to several minutes). This configuration may prevent errors. The activation of the emergency stop assistance function can cause the vehicle to apply brakes until reaching a full standstill, thus preventing uncontrolled and high speed further travel of the vehicle during an emergency.

A first stage selection can also comprise at least a first and second activation stage, which are executed successively in the automatic activation, wherein the first of these activation stages is preferably skipped in the case of a manual activation. This results in a significant reduction in the time needed for the activation.

In some examples, when activated automatically, a warning can first be issued to the driver in accordance with a first activation stage, in particular to request that the driver assume control of the vehicle, and/or initiate braking and/or seatbelt tensioning. This may be advantageous if the driver can still be alerted to assume control of the vehicle. In this case, the emergency stop assistance function can then be deactivated if driver activity is detected, for example. Furthermore, after issuing this warning, and/or pumping the brakes and/or tensioning the seatbelt, if driver inactivity is still detected after a predefined time period, a second activation stage can then be executed, wherein the second activation stage is preferably executed immediately in the case of a manual activation.

It is also advantageous if the manual activation first takes place in the framework of the present disclosure when a pushing or pulling of the operating element is detected, and/or stopping the actuation of the operating element is detected, wherein the vehicle is preferably already braked prior to stopping the actuation. This braking takes place, for example, using the parking brake, to further increase safety during a stopping maneuver. The primary function of the operating element can be the activation of the parking brake or engagement of the parking lock, and a secondary function can be the activation of the emergency stop assistance function, wherein it may only be possible to activate the secondary function while driving, unlike the primary function.

The manual activation of the emergency stop assistance function can advantageously first take place when a pushing or pulling of the operating element has been detected, wherein the pushing is exclusively designated for activating the emergency stop assistance function in the vehicle. Pushing is understood to mean, in particular movement in a direction of movement (counter to pulling) in particular toward the floor of the vehicle, or in the direction of travel.

Turning to FIG. 1, the drawing shows an assistance system 10 according to an illustrative example for a vehicle 1 for providing an emergency stop assistance function under the present disclosure. The assistance system 10 may be part of an electronics system in the vehicle 1, and can accordingly contain at least one control device for executing the steps of the method according to the present disclosure. The assistance system 10 may also be connected to at least one other component in the vehicle 1, e.g. sensors (cameras, distance sensors, etc.), a braking system, a system for activating seatbelt tensioners, an output system (such as an instrument panel or the central console), etc.

The assistance system 10 may include at least one execution device 13 for executing the emergency stop assistance function with at least one of numerous activation stages 100. The activation stages 100 can each include one or more functions and/or procedures that are executed for the emergency stop assistance function. The execution device 13 may contain an execution system with at least one microcontroller or processor, etc., for executing the at least one, or all, of the activation stages 100.

It is also possible to execute the emergency stop assistance function in different ways, for example, with different sequences of these functions and/or procedures. As such, specific activation stages 100 can be assigned only to automatic activation, such as an automated type of activation, of the emergency stop assistance function, and accordingly, the emergency stop assistance function is not executed with a manual triggering, for example, with a manual type of activation. This is particularly because the automatic activation is executed as the result of an automated detection of driver inactivity, requiring that there is no error detection. There can be a first activation stage 101 for this, which takes a latent or actual emergency stop into account. In contrast, it is not necessary to eliminate this error detection with a manual triggering, because this normally requires a conscious action on the part of the occupants, in particular a passenger. Optionally, another activation stage could be executed instead, for example, using an adapted first activation stage or, directly, a second activation stage, for detecting an operating error by the occupants, in particular the passenger in the front seat.

The assistance system 10 may include a detection device 12 for automatically detecting driver inactivity, in order to activate the emergency stop assistance function with a first stage selection 110 of the activation stages 100. To eliminate any error detection, the first stage selection 110 may include a first activation stage 101 for issuing a request, and/or warning, and/or alarm signal to the driver.

In some examples, there may be a triggering device 11 configured for monitoring an operating element 20 for an electric parking brake or a parking lock in a vehicle 1 transmission in the assistance system 10 according to the present disclosure, in order to activate the emergency stop assistance function with a second stage selection 120 of the activation stages 100, which differs from the first stage selection 110, when the operating element 20 is actuated manually. In this case, there is no need for error detection, because it is activated intentionally. It is assumed in this case that an emergency situation has been detected, e.g. by the passenger, and thus actually exists. It is therefore unnecessary to issue a request, and/or warning, and/or alarm signal. Instead, some other type of warning may optionally be issued, in order to detect, for example, an operating error. Despite the manual actuation, it may also be the case that an attempt is made to arouse the driver, through a rousing action, and/or issuing the alarm signal, e.g. a tensioning of the seatbelt.

Both the detection device 12 as well as the triggering device 11 can be configured as separate components, e.g. control units, etc., or they can be integrated in the execution device 13, and may be provided by the same execution assembly. In other words, the devices in the assistance system 10 can also form a collective component or device, or they can each be separate devices.

The triggering device 11 can trigger the monitoring of the operating element 20 in that the assistance system 10 has an electrical connection to a brake system, the operating element, and/or the parking lock, etc. in the vehicle 1. An electrical triggering can then be detected via this connection when an occupant of the vehicle 1 moves the operating element 20. The operating element 20 can be a lever, switch, or button, etc. and can be moved in at least one direction. A first movement path is defined by pulling or pushing the operating element 20 from a starting position for the operating element, which then activates the electronic parking brake or engage the parking lock in the vehicle 1. This has the advantage that the occupants, in particular the front seat passenger, already know of the braking function or the parking/stopping function, and therefore intuitively know how this movement can be used for triggering the emergency stop assistance function. Alternately or addition, the operating element 20 may also be pushed from the starting position. This additional pushing can be exclusively assigned to the emergency stop assistance function, and detected accordingly.

If such a manual actuation is detected, the triggering device 11 can activate the emergency stop assistance function with the second stage selection 120 of the activation stages 100. If driver inactivity is detected automatically, the emergency stop assistance function may be activated with the first stage selection 110 of the activation stages 100. These may be configured as different stage selections. By way of example, the first stage selection 110 comprises at least one additional or different activation stage 100 to those in the second stage selection 120.

A possible activation stage 100 is explained in greater detail below. In some examples, only some of the activation stages 100 may be provided in the second stage selection 120. This means that with a manual actuation of the operating element 20, only some of these activation stages 100 can be used in the second stage selection 120 to execute the emergency stop assistance function.

Figure 2:
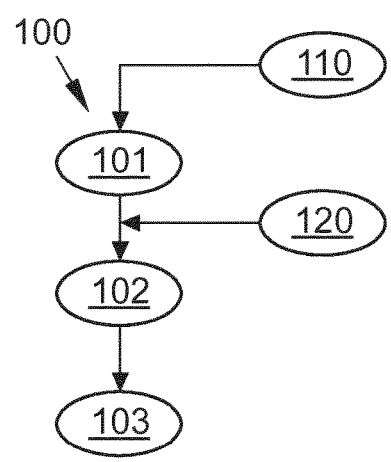
FIG. 2: shows a schematic illustration of a method according to an illustrative example.

In some examples, an output initiation device 14 may be configured that issues a warning to the occupants of the vehicle 1 in a first activation stage 101. In order to enable this with an automatic activation, the execution device 13 can be configured to execute the first activation stage 101 in the first stage selection 110. In the second stage selection 120, the first activation stage 101 can be skipped, such that it is not executed. This sequence is shown in FIG. 2 to illustrate the method according to the present disclosure.

As FIG. 1 shows, there can also be an alarm device 15 that triggers at least one alarm, preferably pumping the brakes and/or tensioning a seatbelt in the vehicle. This alarm can be assigned to a second activation stage 102, to alert the driver, or to actively make the driver aware that the emergency stop assistance has been activated. Such a function may only be available with an automatic activation, or it can also be available with a manual activation. Accordingly, the execution device 13 can be configured to execute the second activation stage 102 in the first stage selection 110 and optionally, in the second stage selection 120 as well.

In some examples, a function initiation device 16 may be configured that initiates safety-relevant functions for the vehicle 1 when stopping the vehicle 1 in a third activation stage 103, wherein the execution device 13 is configured to execute the third activation stage 103 in the first stage selection 110 and in the second stage selection 120. The third activation stage 103 is the core of the emergency stop assistance function, which initiates a safe braking of the vehicle 1 until reaching a standstill, and/or activation of the brake lights, and/or sending out an emergency call, etc.

The triggering device 11 can also be configured to ignore temporal intermittent activation of the operating element 20. The suppression of this temporal activation may be used to eliminate the possibility of an operating error with the operating element 20. A predefined time period can elapse after a pulling or pushing of the operating element has been detected. If the actuation is stopped within this time period, it can be regarded as an operating error. If the actuation is stopped and/or completed after this time period has elapsed, this actuation may be regarded as a manual actuation of the operating element 20.

In a method according to the present disclosure, it may be possible that a monitoring of the driver of the vehicle 1 while driving first takes place, in order to automatically activate the emergency stop assistance function, if driver inactivity has been detected. Driver inactivity is indicated if, for example, the driver has not moved the steering wheel for a certain amount of time. A camera image of the driver can also be configured for this purpose. Furthermore, the operating element 20 for the electric parking brake or parking lock in the vehicle 1 can be executed while the vehicle is being driven in order to manually activate the emergency stop assistance function when a manual actuation of the operating element 20 has been detected. This allows a passenger in the front seat to manually trigger the emergency stop assistance function without waiting for an automatic detection of driver inactivity. The emergency stop assistance function can therefore be executed with a selection of at least one of numerous activation stages 100, wherein the selection is based on the type of activation. A first stage selection 110 can comprise at least a first and second activation stage 101, 102, which are executed successively with an automatic activation, wherein the first of these activation stages 100 can be skipped in the case of a manual activation. The driver can also first be issued a warning in a first activation stage 101 in the case of an automatic activation, to request that the driver assume control of the vehicle 1, and/or to initiate a pumping of the brakes, and/or tensioning of the seatbelt, in particular to alert the driver. After this initiation (issuing a warning, and/or pumping the brakes and/or tensioning the seatbelt), a second activation stage 102 may be executed after further driver inactivity for a predefined time period, wherein the second activation stage 102 is executed immediately in the case of a manual activation. This is clearly illustrated in FIG. 2. Furthermore, manual activation can advantageously first take place when a pulling of the operating element 20 and/or a stopping of the actuation of the operating element 20 has been detected, wherein a braking of the vehicle 1 preferably takes place prior to ending the actuation, in particular through the parking brake functionality.

The above explanations of the embodiments exclusively describe the present invention in the framework of examples. As a matter of course, individual features of the embodiments can be freely combined, if this makes sense from a technological perspective, without abandoning the framework of the present invention.

LIST OF REFERENCE SYMBOLS

1 vehicle
10 assistance system
11 triggering device
12 detection device
13 execution device
14 output initiation device
15 alarm initiation device
16 function initiation device
20 operating element
100 activation stages
101 first activation stage
102 second activation stage
103 third activation stage
110 first stage selection
120 second stage selection

The invention claimed is:

1. An assistance system for a vehicle for providing an emergency stop assistance function, comprising:
   an execution device configured to execute the emergency stop assistance function using a plurality of activation stages;
   a detection device configured to automatically detect driver inactivity, and to activate the emergency stop assistance function using a first stage selection of the plurality of activation stages;
   a triggering device for detecting a manually activated operating element for an electric parking brake or a parking lock in a transmission in the vehicle after the first stage selection is activated; and
   activating the emergency stop assistance function using a second stage selection of the plurality of activation stages, based on the detected manually activated operating element, wherein the second stage selection is different from the first stage selection.

2. The assistance system according to claim 1, further comprising an output initiation device configured to issue a warning in the first stage selection, wherein the execution device is further configured to execute a first activation stage in the first stage selection, and to skip the first activation stage in the second stage selection.

3. The assistance system according to claim 2, further comprising an alarm initiation device for initiating at least one alerting action in a second activation stage, wherein the execution device is configured to execute the second activation stage in the first stage selection and in the second stage selection.

4. The assistance system according to claim 3, wherein the alarm initiation device is configured to initiate the at least one alerting action by at least one of (i) activating a brake of the vehicle, and/or (ii) tensioning a seatbelt in the vehicle.

5. The assistance system according to claim 1, further comprising a function initiation device for initiating a safety function of the vehicle comprising stopping the vehicle in a third activation stage, wherein the execution device is configured to execute the third activation stage in the first stage selection and in the second stage selection.

6. The assistance system according to claim 1, wherein the triggering device is configured to ignore temporal intermittent activation of the operating element.

7. A method of operating an assistance system for a vehicle for providing an emergency stop assistance function, comprising:
   configuring an execution device to execute the emergency stop assistance function using a plurality of activation stages;
   automatically detecting driver inactivity via a detection device;
   activating the emergency stop assistance function using a first stage selection of the plurality of activation stages;
   detecting, via a trigger device, activation of a manually activated operating element for an electric parking brake or a parking lock in a transmission in the vehicle after the first stage selection is activated; and
   activating the emergency stop assistance function using a second stage selection of the plurality of activation stages, based on the activation of the manually activated operating element, wherein the second stage selection is different from the first stage selection.

8. The method according to claim 7, further comprising issuing a warning, via an output initiation device, in the first stage selection, and executing, via the execution device, a first activation stage in the first stage selection, and to skip the first activation stage in the second stage selection.

9. The method according to claim 8, further comprising initiating, via an alarm initiation device, at least one alerting action in a second activation stage, and executing the second activation stage in the first stage selection and in the second stage selection.

10. The method according to claim 9, further comprising initiating, via the alarm initiation device, the at least one alerting action by at least one of (i) activating a brake of the vehicle, and/or (ii) tensioning a seatbelt in the vehicle.

11. The method according to claim 7, further comprising initiating, via a function initiation device, a safety function of the vehicle comprising stopping the vehicle in a third activation stage, and executing, via the execution device, the third activation stage in the first stage selection and in the second stage selection.

12. The method according to claim 7, further comprising ignoring, via the triggering device, temporal intermittent activation of the operating element.

13. An assistance system for a vehicle for providing an emergency stop assistance function, comprising:
   an execution device configured to execute the emergency stop assistance function using a plurality of activation stages;
   a detection device configured to automatically detect driver inactivity with respect to at least one vehicle component, and to activate the emergency stop assistance function using a first stage selection comprising an automatic activation of the plurality of activation stages;
   a triggering device for detecting activation of a manually activated operating element for an electric parking brake or a parking lock in a transmission in the vehicle to activate the emergency stop assistance function using a second stage selection, based on the activation of the manually activated operating element, after the first stage selection of the plurality of activation stages, wherein the second stage selection is configured to be executed after a predefined time period of detected driver inactivity has elapsed.

14. The assistance system according to claim 13, further comprising an output initiation device configured to issue a warning in the first stage selection, wherein the execution device is further configured to execute a first activation stage in the first stage selection, and to skip the first activation stage in the second stage selection.

15. The assistance system according to claim 14, further comprising an alarm initiation device for initiating at least one alerting action in a second activation stage, wherein the execution device is configured to execute the second activation stage in the first stage selection and in the second stage selection.

16. The assistance system according to claim 15, wherein the alarm initiation device is configured to initiate the at least one alerting action by at least one of (i) activating a brake of the vehicle, and/or (ii) tensioning a seatbelt in the vehicle.

17. The assistance system according to claim 13, further comprising a function initiation device for initiating a safety function of the vehicle comprising stopping the vehicle in a third activation stage, wherein the execution device is configured to execute the third activation stage in the first stage selection and in the second stage selection.

18. The assistance system according to claim 13, wherein the triggering device is configured to ignore temporal intermittent activation of the operating element.

\* \* \* \* \*